May 12, 1959     R. HAYOS ET AL     2,886,010

CLOSED LOOP SERVO SYSTEM WITH MAGNETIC FEEDBACK MEANS

Filed July 12, 1957

INVENTORS:
Robert Hayos,
Rodney L. Raymond
By Hubert E. Metcalf
Their Patent Attorney

2,886,010
CLOSED LOOP SERVO SYSTEM WITH MAGNETIC FEEDBACK MEANS

Robert Hayos, El Segundo, and Rodney L. Raymond, Long Beach, Calif., assignors to Northrop Aircraft, Inc., Hawthorne, Calif., a corporation of California Application July 12, 1957, Serial No. 671,452

8 Claims. (Cl. 121—41)

This invention relates to the servo mechanism art and more particularly to an electro-hydraulic servo system of the closed loop type which incorporates non-electrical feedback means which function to nullify initial command signals which are fed into the system under predetermined conditions.

To the best of applicants' knowledge all electro-hydraulic servo systems employ an electrical potentiometer to provide positioning signals which when fed back into the system function to cancel or nullify command signals initially fed into the system. A servo system of this type is necessarily of greater weight and requires more space for its installation than the relatively simple servo system as disclosed herein.

It is also well known that conventional types of electro-hydraulic servo systems are susceptible to various types of failures. One of the most frequent and objectional failures is commonly referred to as a "hardover" failure. In this type of malfunction the servo's output member moves to an extreme end of its travel. This failure is primarily due to a loss of signal to the servo valve. The above failure is particularly objectional and may lead to disastrous results if the servo system is utilized to position the control surfaces of an aircraft or the like.

Accordingly it is an object of the present invention to provide an electro-hydraulic servo system of the closed loop type which will preclude system failures of the "hardover" type.

Another object is to provide an electro-hydraulic servo system of the closed loop type in which a non-electrical feedback is utilized to cancel the effect of initial command signals which are fed into the system under predetermined conditions.

Another object is to provide a servo mechanism which is relatively light in weight, simple yet rugged in construction and which is substantially free of malfunctioning tendencies.

Figure 1:
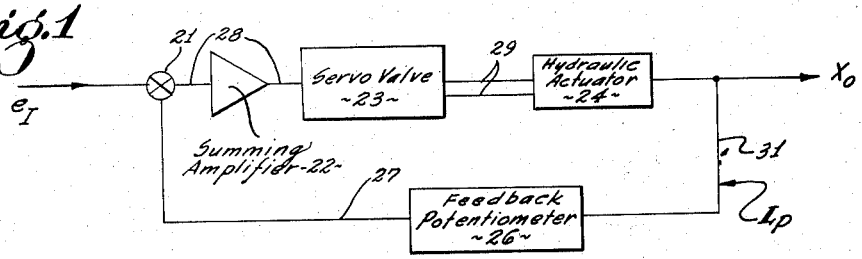
Fig. 1 is a block diagram schematically illustrating a conventional electro-hydraulic servo system of the closed loop type.

Referring now to the drawing, a better understanding of the invention will be forthcoming from an examination of the block diagrams of Fgures 1 and 2 and an explanation of the latter diagram.

In Figure 1 conventional electro-hydraulic servo apparatus is shown which includes the following components: a summing point 21, amplifier 22, electro-hydraulic valve 23, hydraulic actuator 24 having an output member $X_o$ and a feedback potentiometer 26. These components are connected through electrical connectors 27 and 28, hydraulic lines 29—29 and mechanical linkage 31 to provide a closed loop servo system $L_p$ which operates in a conventional and well known manner.

Figure 2:
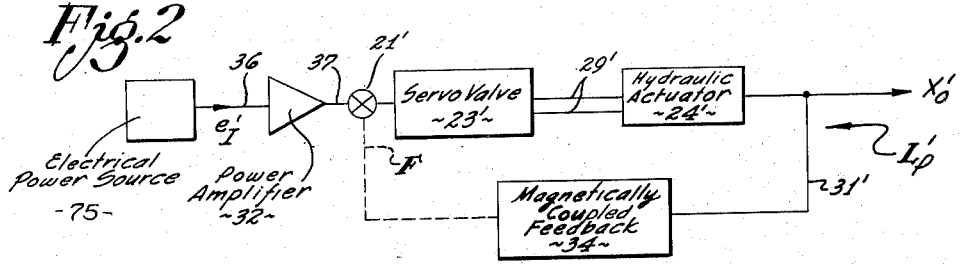
Figure 2 is a block diagram schematically illustrating an electro-hydraulic servo system of the type disclosed herein.

The block diagram of Figure 2 schematically illustrates electro-hydraulic servo apparatus of the type disclosed herein. In some respects this apparatus is similar to servo apparatus as disclosed in copending U.S. patent application Serial Number 549,609, dated November 29, 1955.

The servo apparatus of Figure 2 includes the following components: a power amplifier 32, electro-hydraulic valve 23′, hydraulic actuator 24′ having an output member $X_o'$ and magnetic feedback means 34. These components are connected by electrical connectors 36 and 37, hydraulic lines 29′—29′ and mechanical linkage means 31′, the latter being rigidly fixed to and moves with the output member $X_o'$.

In the apparatus as shown in Figure 2, initial command signals $e'_I$ originating at a location outside of the loop $L'_p$ are transmitted to the amplifier 32 and in turn to the valve 23′. These command signals when received by a coil constituting a part of the valve 23′ result in movements of the output member of the actuator 24′. Movement of the output member in turn results in relative movement of the magnetic means 34 with respect to the valve 23′, to provide a cancelling magnetic force schematically indicated by the dotted line F. This magnetic force acts on a flapper member of the valve to neutralize polarization previously imparted thereto by the signals $e'_I$. The manner of accomplishing the above operation will become apparent as the disclosure progresses.

Figure 3:
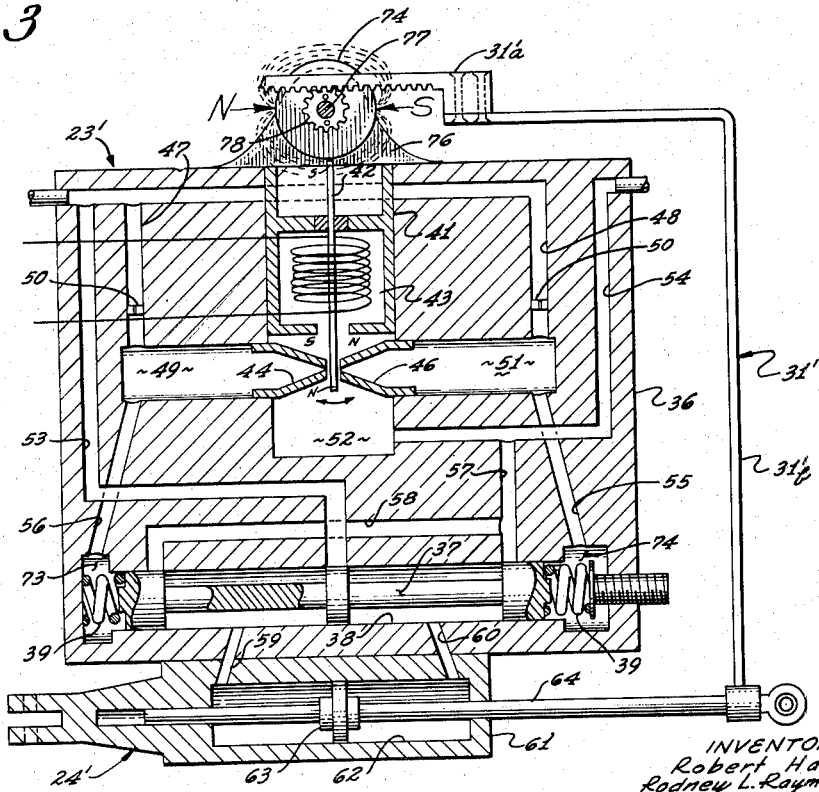
Figure 3 is a detailed schematic sectional view of an electro-hydraulic servo mechanism of the type disclosed herein and which constitutes a component of the servo system as shown in Figure 2.

The present invention is put into effect by means of a conventional electro-hydraulic valve 23′ of the type shown in Figure 3. Due to the conventional nature of the valve 23′ and actuator 24′ these elements will not be described in detail, however, their components will be identified together with a brief description of their operation.

The valve 23′ consists of a housing 36 in which a spool type valve element 37 is operationally mounted in a bore 38. The valve spool element is normally urged to a neutral position by a pair of centering springs 39—39. Also mounted in the housing 36 is a permanent magnet 41, an elongated magnetically permeable flapper valve member 42 constructed of a resilient thin material, and an induction coil 43. Nozzle members 44 and 46 are spaced equal distances on each side of the valve member 42. Inlet passages 47 and 48, opposed bores 49 and 51, exhaust chamber 52, and passageways 53 to 60, inclusive, provide means for the passage of fluid through the housing 36. Identical restrictor elements 50—50 are located in each of the inlet passages 47 and 48.

The actuator 24′ is of the piston type and consists of a housing 61 having a chamber 62 formed therein and in which a piston 63 and rod 64, hereinafter referred to as the output member of the actuator 24′, are operationally mounted.

The servo valve 23′ as described so far constitutes conventional valve structure and briefly operates as follows: Initial command signals $e'_I$ are transmitted to the coil 43, by means of the amplifier 32 of Figure 2 and connectors 36 and 37, and effect the energization of the coil 43. Simultaneously the valve element 42 is polarized and the permanent magnet 41 now deflects the valve element 42 either to the right or left according to the direction of current flow through the coil 43. Accordingly unequal fluid pressures are temporarily created in the chambers 73 and 74, located at respective ends of the valve spool 37, and pressurized fluid is directed to one end of the chamber 62 to move the piston 63 and output member 64 in a desired direction. In conventional valves feedback signals are normally provided by an electrical potentiometer 26 (Figure 1) which act to cancel or neutralize the signals $e_I$ and allow the valve spool 37 to return to neutral and the piston 63 and output member 64 to assume a new position. In the present embodiment these feedback signals are replaced by a magnetic force provided by a permanent cylindrical magnet 74.

The permanent magnet 74 is polarized transversely to provide magnetic poles at diametrically opposite positions with respect to the longitudinal axis of the magnet. The magnet is pivotally mounted with its longitudinal axis extending in a horizontal direction as viewed in Figure 3 and is supported in this attitude by a pair of lugs 76 extending above the upper surface of the housing 36. The magnet is supported by a rod 77 extending therethrough and on which the magnet rotates and the ends of the rod are positioned in apertures provided in the lugs 76.

It will also be seen that the upper end of the valve member 42 has a substantially flush or a slightly protruding relation with the upper surface of the housing 36. The magnet 74 as mounted on the housing 36 is positioned directly above the member 42 with the axis of the magnet extending in a horizontal direction. The magnets relative position on the housing 36 is further characterized in that the longitudinal axis of the element 42 and magnet 74 lie in a common vertical plane. In this position suitable clearance is provided between the periphery of the magnet 74 and the upper end of the member 42. In order that the magnet 74 may exert its maximum influence on the member 42 the aforementioned clearance should not exceed .005".

Rotatably mounted on the rod 77 at one end of the magnet 74 is a small spur gear 78. This gear is secured to and pivots with the magnet 74 and meshes with a rack $31_a'$ which is secured to and constitutes an integral part of the aforementioned linkage means 31'. The means 31' also includes an L-shaped rod $31_b'$ one end of which is attached to the rack $31_a'$ and the other end to the output member 64 of the actuator 24'. It will therefore be seen that as the output member 64 is translated the rack $31_a'$ will be similarily translated and the magnet 74 pivoted about its longitudinal axis.

At such times as the piston 63 is midway between the end walls of the chamber 62 the piston 63 and output member 64 are in their centered positions. With the piston and output member in their centered position, and at such times as no command signals are reaching the coil 43, the valve spool 37 will also be in a centered position as shown in Figure 3. Further, at this time the valve member 42 will be in a vertical position with its lower end located midway between the nozzle members 44 and 46. Also at this time the magnet 74 is positioned by the rack $31_a'$ so that its poles lie in a horizontal plane and, therefore, do not exert any polarizing influence on the member 42.

Assume now that it is desired to move the output member 64 to the right. Accordingly a command signal $e_I'$, originating in an electric power source 75, is transmitted to the coil 43 which polarizes the member 42 so that a north pole is provided at the lower end thereof. This action results in an increase in fluid pressure in bore 49 which urges the valve spool 37 to the right. Pressurized fluid is now free to enter the left end of chamber 62 urging the piston 63 and output member 64 to the right.

As the output member 64 moves to the right the rack $31_a'$ is also moved to the right and the magnet 74 pivoted in a clockwise direction. Accordingly the south pole is moved into closer proximity with the upper and currently the south pole end of the element 42. As the south pole of the magnet 74 approaches the upper end of the element 42 the polarization induced therein by the signal $e_I'$ is effectively nulled, the element 42 is depolarized and returns to its neutral or vertical position due to its inherent resilient characteristics. Accordingly fluid pressure in bores 49 and 51, chambers 73 and 74, and on both sides of the piston 63 is rendered equal and the output member 64 remains in its new position until such time as new command signals $e_I'$ or alternately no command signals are received by the coil 43.

Should command signals $e_I'$ be transmitted to the coil 43 to provide a south pole at the lower end of the element 42 the output member 64 will be urged to the left. In this instance the magnet 74 will function in a similar way as described above to neutralize the command signals and stabilize fluid pressures throughout the valve 23'.

The magnet 74 also provides a "fail-safe" feature in the event command signals fail to reach the coil 43. Assuming that the output member 64 has been moved either to the right or left of its centered position and under these conditions command signals $e_I'$ being transmitted to the coil 43 are interrupted. Under these conditions the magnet 74 will be the only agent acting to polarize the member 42. Accordingly the polarity of the member 42 will be reversed and the output member 64 returned to its neutral position in a manner that will be obvious to one skilled in the art and in view of the above explanation. Further it will be obvious that once the output member has been returned to its neutral position it will be maintained in this position due to the effect of the magnet 74 until such time as command signals are again received by the coil 43. Thus a typical failure of a servo system referred to above as "hardover" is effectively eliminated by the magnet 74.

To the best of applicants' knowledge a cylindrical magnet polarized transversely and mounted as disclosed herein is the only type of magnet which will effectively and satisfactorily neutralize the effect of command signals having sufficient amplitude to effectively operate an electro-hydraulic valve of the type shown in Figure 3. This is probably due to the advantageous manner of mounting the magnet 74 on the housing 36, the close proximity of the magnetic field of the magnet 74 with respect to the element 42, and the concentration of the magnetic field of a cylindrical magnet polarized transversely.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In an electro-hydraulic servo assembly including an actuator portion having an output member and a valve portion having a coil and valve member, the latter being polarized in response to current flow through said coil which in turn initiates fluid flow through said assembly to impart desired movements to said output member, the combination comprising: a permanent magnet of cylindrical configuration polarized transversely; said magnet being mounted on said assembly for pivotal movement and in a position to effect the polarization of said valve member; and motion transmitting means extending between said output member and magnet and adapted to impart pivotal movement to the latter in response to movements of said output member.

2. Apparatus as set forth in claim 1: further characterized in that said motion transmitting means is fixedly secured to said output member and coupled to said magnet to pivot the latter in a direction to polarize said valve member in an opposite sense to the polarization induced therein by current flow through said coil.

3. Apparatus as set forth in claim 1: further characterized in that said valve member is elongated and has a longitudinal axis and as mounted in said assembly has one end in flush or protruding relation with an outer surface of said assembly and said magnet is mounted with the periphery thereof having an adjacent relation with said one end.

4. Apparatus as set forth in claim 3: further characterized in that the longitudinal axis of said magnet in its mounted position is normal to the axis of said valve member and both axes lie in a common plane.

5. Apparatus as set forth in claim 4: further characterized in that said output member has a centered position in said assembly and the poles of said magnet lie in a reference plane which is normal to said common plane and coincides with the longitudinal axis of said magnet at such times as said output member is in said centered position.

6. In an electro-hydraulic servo system the combination comprising: a valve and actuator assembly having a valve member which is polarizable in response to current flow through a coil surrounding said member and an output member operationally mounted in said assembly; a sole source of electrical power connected to said coil and adapted to energize the latter to effect polarization of said valve member which in turn initiates fluid flow through said assembly to impart desired movements to said output member; a permanent cylindrical magnet which is polarized transversely; said magnet being mounted on said assembly for pivotal movement to effect the polarization of said valve member; and motion transmitting means extending between said output member and magnet adapted to impart pivotal movement to the latter in response to movements of said output member and functions to induce polarization in said valve member opposing the polarization induced therein by current flow through said coil.

7. Apparatus as set forth in claim 6: further characterized in that said valve member is elongated and has a longitudinal axis of symmetry and as mounted in said assembly has one end in flush or protruding relation with an outer surface of said assembly and said magnet is mounted with the periphery thereof in adjacent relation with said one end.

8. Apparatus as set forth in claim 7: further characterized in that the longitudinal axis of said magnet in its mounted position is normal to the axis of said valve member and both axes lie in a common plane.

No references cited.